Dec. 1, 1964    I. J. OLESEN    3,158,915
WIRE ROPE CLAMPS
Filed June 2, 1960    2 Sheets-Sheet 1
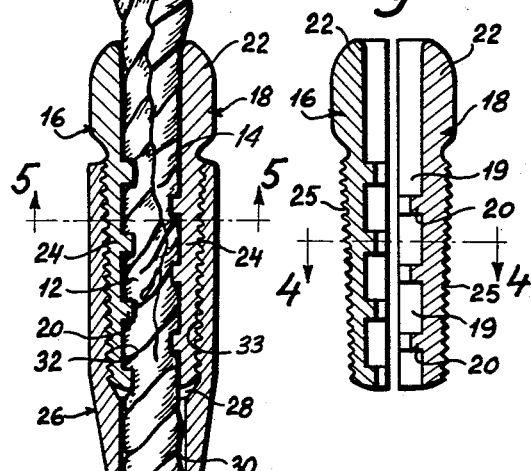
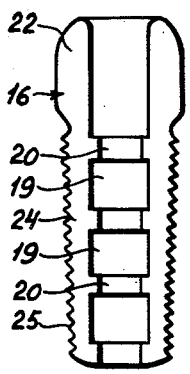
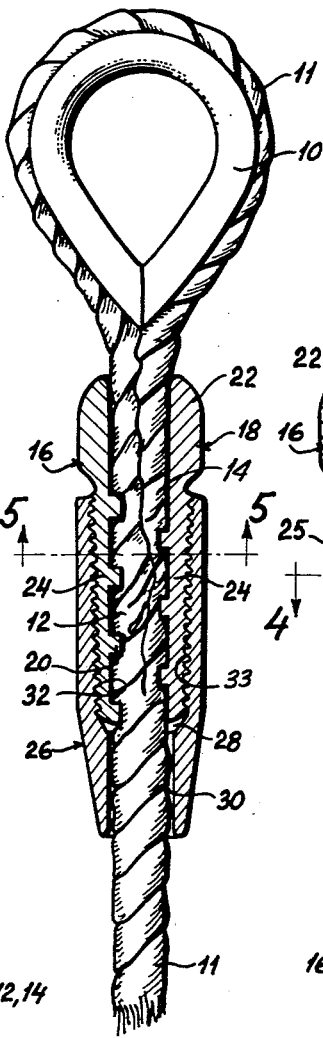
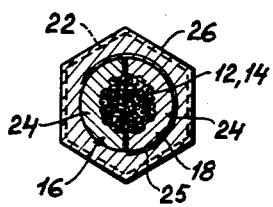
INVENTOR:
Immanuel Johannes Olesen,
BY
His Attorney.

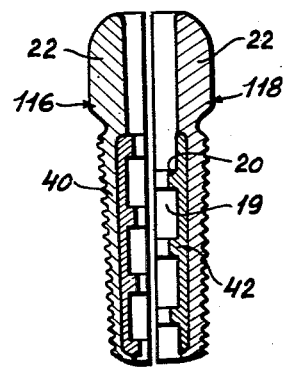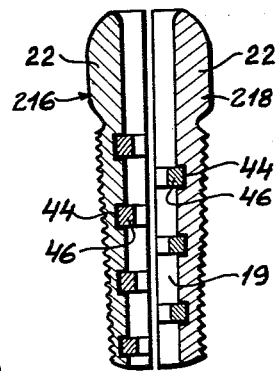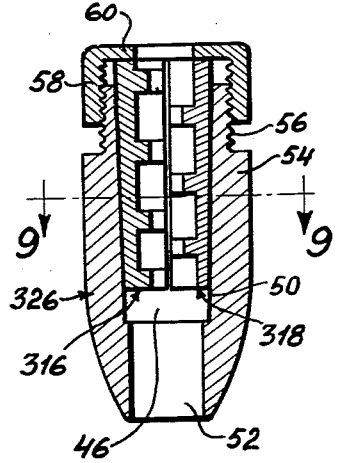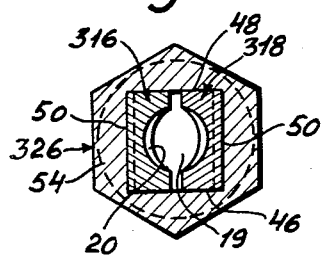

United States Patent Office 3,158,915
Patented Dec. 1, 1964

3,158,915
WIRE ROPE CLAMPS
Immanuel Johannes Olesen, Allerod, near Copenhagen, Denmark; Hermina Olesen, executor of the estate of said Immanuel J. Olesen, deceased, assignor to Malodan A/S, Copenhagen, Denmark
Filed June 2, 1960, Ser. No. 33,518
Claims priority, application Great Britain June 8, 1959
10 Claims. (Cl. 24—124)

This invention relates to wire rope clamps for connecting two steel wire rope parts, for example for fastening a wire rope round a thimble, and more specifically to wire rope clamps of the kind comprising at least two clamping jaws provided with opposed longitudinal grooves and adapted to be arranged in assembled embracing relation with respect to the rope parts to be connected, which clamping jaws further are adapted to be introduced into an outer casing provided with an inner surface, said inner surface and the outer surfaces of said jaws being designed to secure a pressing together of said jaws when said jaws are longitudinally forced into said outer casing, so that the inner portions of the jaws by such a longitudinal forcing of the assembled jaws into said outer casing are forced into tight gripping contact with the rope parts embraced by the jaws.

Hitherto known wire rope clamps of this kind have shown to suffer from the drawback that the rope parts have liability to slide in the clamp when the pull in the rope rises above a certain value, most often far below the tensile strength of the rope. Probably this is partly due thereto that a pull in the rope causes the diameter of the rope to be diminished owing to a yielding of the windings of the rope, partly thereto that the friction between the jaws and the rope parts is not able by greater pulls in the rope to prevent sliding of the rope parts.

Therefore, when hitherto it has been desired to use a rope connection being able to transmit tensile strength of about the same magnitude as the tensile strength of the rope, it has been necessary either to use splicing, which requires, however, great professional skill, long working-hours, and a long splicing length, the latter being in many cases most inappropriate, or to use a connection provided by means of a so-called Talurit wire rope clamp, that is an aluminium bushing into which the rope parts are inserted, whereupon the bushing is inserted in a press and compressed under great swaging pressure so that the rope parts and the bushing form a unit.

By this last mentioned wire rope clamp an extremely reliable connection is obtained having a tensile strength of the same magnitude as the tensile strength of the wire rope itself. Moreover, it is obtained that the length as well as the thickness of the connection can be kept within fairly small diameters, and also that the outer side can be made smooth.

It is, however, a drawback by a wire rope clamp of the last mentioned type that for the swaging of the clamp round the rope parts, a stationary press is required which can exert a very great pressure and that further special tools are required for the guidance of the clamp during the swaging operation. Consequently, tools are needed which are very expensive so that only special work-shops which can expect to make rope connections for a great number of customers are able to obtain sufficient allowance for interest and depreciation on tool expenses.

An object of the invention is to provide a wire rope clamp of the type stated above by which a rope connection can be obtained having more than sufficient strength for providing a steel wire rope connection almost as strong as the rope itself.

Another object of the invention is to provide such a wire rope clamp which has smooth outer surfaces and relatively small dimensions, preferably dimensions of the same magnitude as the known Talurit wire rope clamps referred to above.

A further object of the invention is to provide such a wire rope clamp which does not require special tools but only tools such as vises and/or wrenches which are available at most workshops and also always are available onboard steamships as well as motorships.

With these and other objects in view an essential feature of the present invention is that the grooves of the jaws are provided with transverse arcuate ribs, adapted to engage the wire rope parts to be connected, which ribs are made from a material softer than the rope material, for example from a strong plastic such as nylon, or from a soft metal such as a soft aluminium alloy. Hereby is obtained that the parts of the ribs engaging the rope parts will, owing to the contacting pressure, be forced in between the windings of the rope and thereby bring about some kind of welding between the rope parts and between the latter and the jaws.

A still further object of the invention is to provide methods of connecting two steel wire rope parts by means of the new wire rope clamp by which methods the strength of the clamping connection can be further increased.

Further objects and advantages will become apparent from the following description and the accompanying drawings in which FIG. 1 is a central section of an embodiment of the new wire rope clamp used for fastening a rope round a thimble, FIG. 2 is an inside view of a jaw constituting a part of the wire rope clamp shown in FIG. 1, FIG. 3 is a central section of two oppositely arranged co-operating jaws of the kind shown in FIG. 2, FIG. 4 is a section on line 4—4 in FIG. 3, FIG. 5 is a section on line 5—5 in FIG. 1, FIGS. 6 and 7 are central sections similar to FIG. 3 but showing two modifications of the jaws, FIG. 8 is a central section of another embodiment of the new wire rope clamp, and FIG. 9 is a section on line 9—9 in FIG. 8.

In FIG. 1, 10 designates a thimble round which is placed a steel wire rope 11, the free end 14 of which extends a distance down along the uppermost part 12 of the rope 11 leading to the thimble.

Embracing the adjacent rope parts 12 and 14 two jaws 16 and 18, see FIGS. 2 and 3, are arranged. These jaws are made from a material which is essentially softer than the steel used for the rope, preferably having an elastic limit of below 9 kg./mm.$^2$, for example from a strong plastic, preferably nylon, or from a soft metal such as a soft but nevertheless strong aluminium alloy consisting of 5 to 7% silicium and 92–95% aluminium, preferably consisting of 6% silicium and 94% aluminium.

Each jaw is provided with a longitudinal groove 19 having a diameter somewhat greater than the diameter of the rope 11 but essentially smaller than twice this diameter.

The groove 19 in each jaw 16 and 18 has at several points by means of interspaced ribs 20 been given a smaller cross section. As will appear from FIG. 3, the ribs 20 are arranged differently on the two jaws 16 and 18 and so that when the two jaws are abutting each other the ribs 20 of the one jaw are staggered relative to the ribs of the other jaw.

Apart from the ribs 20 the groove 19 may have the same cross section throughout, but the cross section of the grooves may also decrease in the downward direction seen when the jaws are kept vertical in the manner shown in the drawing. The groove may also be formed that its depth, still apart from the ribs 20, increases at both sides of a point located between the ends of the jaw. A constant groove depth appears most advantageous in connection with ropes without a hemp core whereas a varying groove depth has proved advantageous for certain types of ropes with a hemp core.

The two jaws 16 and 18 are each provided with a head 22 and a conical body 24, the latter being threaded with threads 25 on the outer side.

When two jaws 16 and 18 have been arranged in embracing relation with respect to the two adjacent parts 12 and 14 of the rope 11, the pointed end of the jaw unit consisting of the two jaws is inserted into an outer casing 26, see FIG. 1, which is provided with a bore 28 comprising a conical part 32, the conicity of which corresponds to the conicity of the body 24 of the jaws and which ends in a cylindrical end bore 30 having a diameter only slightly greater than the diameter of the rope 11. The length of the conical part 32 of the bore 28 is at least equal to the length of the body 24 of the jaws 16 and 18 and is provided with an internal thread 33 corresponding to the thread 25 of the jaw bodies 24.

The outer casing 26 is made from a relatively strong and hard material, for example from malleable cast iron, from steel, or, most appropriate, from a hard aluminium alloy such as an alloy consisting of 9% silicium, 3% copper and 88% aluminium.

The heads 22 of the jaws are so designed that when the two jaws abut each other, together they have a polygonal cross section, see FIG. 5, that is a nut shaped cross section, and they can thus be retained pressed against each other, for example in a vise or a wrench. The upper portion of the outer casing 26 is also polygonal so that it can be grasped by means of a wrench.

When the conical parts of the jaws 16 and 18 pressed against each other are inserted into the outer casing 26, and the jaws are held for example in a vise, it is possible by means of a wrench to turn the outer casing relative to the jaws, thereby threading the outer casing upwards along the jaws. Owing to the conical shape of the jaw assembly 16, 18 and of the bore part 32 of the outer casing 26 this will cause the jaws to be pressed towards each other with approximately the same force over the whole length of the conical parts of the jaws whereby the jaws are forced tightly to make contact with the rope parts 12 and 14. Thereby these rope parts are pressed together by a great pressure which causes the rope parts to be deformed and to be brought to engage each other so that the risk of a sliding between the two rope parts is reduced.

However, even if the rope parts are pressed together by a very great force this alone will not be able to prevent sliding between the rope parts when the rope is exposed to strong tensile strain.

Therefore, a further interlocking between the rope parts is necessary. By the new wire rope clamp this is obtained in the following manner:

When the pressure between the jaws 16 and 18 and the rope parts 12 and 14 grows sufficiently great, the surface pressure exerted by the rope parts 12 and 14 on the relatively small end faces of the ribs 20 will be so great that the yielding point or at least the proportionality limit of the jaw material will be exceeded. This causes the jaw material to penetrate into the rope parts 12 and 14 between the windings thereof. Hereby a sort of welding is obtained not only between the two rope parts but also between the latter and the jaws, and thus a connection between the two rope parts is obtained which is able to resist a tensile strain of the same magnitude as the tensile strength of the rope itself, often even a greater tensile strain so that the rope itself breaks before even sliding between the rope parts within the wire rope clamp takes place.

The number of ribs 20 and their dimensions depend on several different factors, amongst others on the thickness of the rope. By thin ropes normally relatively flimsy wire rope clamps will be used and since it is limited how great a radial force it is possible to exert by such a flimsy clamp in the said case a comparatively great number of relatively thin ribs 20 have to be used so that the necessary great surface pressures can be obtained.

In connection with thick ropes, wire rope clamps are used by which it is possible to exert great radial pressures and in that case the number of ribs can be reduced and the ribs can be given a greater width. In this case it is even possible to omit the ribs, since the compression pressure can grow so high that even on great faces the surface pressure can exceed the yield point or the proportionality limit of the material.

It has to be noted that it is not necessary that the jaws 16 and 18 are fully made from a soft material. Thus it is possible as shown in FIG. 6 to use jaws 116 and 118 comprising an outer shell 40 made from a relatively hard material, for example from the same material as the outer casing 26, or for example from cast iron. Each such shell is then provided with a lining 42 made from a soft material and arranged loosely or fixedly in the shell 40. Since such linings are not used for holding the jaws 116 and 118 during the screwing of the latter into the outer casing 26, they may be made from a soft material having only a comparatively small strength, for example from copper or lead even if also in this case it will be most appropriate to use a soft aluminium alloy or a plastic, such as nylon.

Such a lining does not need to be made in one piece or to extend along the whole length of the jaw cavity. Thus in the embodiment shown in FIG. 7 the jaws 216 and 218 are made from a relatively hard material, but are inwardly provided with transverse grooves 44 in which rib members 46, made from a soft material such as nylon or a soft aluminium alloy and constituting the ribs 20, are arranged.

The ribs 20 and 46 on the two jaws are arranged in staggered relation to each other as shown in FIGS. 3, 6 and 7, in order for the two rope parts 12 and 14 to extend in zigzag shape through the clamp whereby the risk of sliding is still more reduced, and the zigzag shape is obtained without the rope parts being locally exposed to so great pressures that danger of a reducing of the tensile strength of the rope parts arises and thereby danger of the rope breaking within the clamp.

As will appear from FIGSS. 2 and 3, the ribs 20 are provided only in the parts of the groove 19 lying opposite the body 24 of the jaws and the uppermost rib 20 is arranged at the transition between the body 24 and the head 22. On the other hand, ribs ought not to be arranged in the part of the groove 19 disposed in the head 22 especially at the upper part thereof. The reason is that while the parts of the jaws 16 and 18 in which ribs 20 are shown will in the assembled condition of the clamp be positioned inside the outer casing 26 so that the parts of the jaws 16 and 18 located opposite all the ribs are supported by the outer casing, the heads 22 of the jaws will not be correspondingly supported. This causes the effect that if ribs were provided in the part of the grooves 19 located inside the heads 22, such strong bending tensions could arise at the transition between the parts of the jaws inserted into the outer casing 26 and the parts of the jaws extending outside the same, that the jaws would break at this transition.

The invention is not restricted to the embodiments described above which may within the scope of the appended claims be amended in many different ways. Thus it is not necessary for the conical parts of the jaws and the outer casing to be threaded. Instead the necessary forcing of the jaws into the outer casing may be obtained for example by means of a union nut which may be screwed on the outer side of the upper part of the outer casing in the same manner as appears from FIGS. 8 and 9.

In the embodiment shown in FIGS. 8 and 9, jaws 316 and 318 are used having square cross-sections but being wedge shaped. Correspondingly the outer casing 326 is provided with a bore comprising an upper part 46 designed correspondingly to the jaw assembling, that is being provided with two opposite parallel side walls 48 and two opposite converging side walls 50, and a lower part 52 having a circular cross section, the diameter of which is a little greater than the diameter of the rope 11.

On the inner side each jaw 316 and 318 is designed in the same manner as appears from FIGS. 2 and 3.

The outer casing 326 is provided with a nut-shaped portion 54 and above this with an outwardly threaded cylindrical part 56 on which is screwed a union nut 58 provided at its upper end with an inwardly directed flange 60 contacting the upper ends of the jaws 316 and 318 so that by screwing on of the union nut 58 on the cylindrical part 56 the jaws 316 and 318 are forced into the square bore part 46 and thereby towards each other.

The new wire rope clamp may be used whenever two rope parts have to be connected to each other, for example as shown in FIG. 1 for making a sling on a rope or for connecting two rope ends, in the latter case independent of whether these ends extend in the same direction, in which case they are introduced between the jaws from the same side thereof, or whether they extend in opposite directions, in which case they are inserted between the jaws from either end thereof.

Often it may be appropriate after the jaws having been pressed together round the rope parts to heat the clamp in a high frequency field to soften the inner portions of the jaws contacting the rope parts so that the material of these inner portions of the jaws is softened in such a degree that it is able to penetrate deep into the rope parts and simultaneously the pressure on the rope parts is reduced and thereby the influence of the rope parts are as small as possible without the clamping effect being reduced.

What I claim is:

1. A wire rope clamp for connecting two steel wire rope parts, comprising in combination; a hollow outer casing having a longitudinal axis; at least two co-operating clamping jaws having opposed concavely curved inner faces; said jaws being adapted to be arranged in assembled embracing relation with respect to the rope parts, said concavely curved inner faces defining a passage for said rope parts and being adapted tightly to engage said rope parts, the rope parts and said jaws assembled with respect thereto being adapted to be introduced into said outer casing; each said jaw having an outer cam follower surface portion forming an angle to said longitudinal axis, said outer casing being provided with inner cam surface portions forming the same angle to said longitudinal axis as said outer surface portions and adapted to engage said outer cam follower surface portions; means for forcing said jaws in said assembled state into said outer casing so that said jaws are owing to the said engagement of said outer cam follower surface portions with said inner cam surface portions forced into tight gripping contact with the wire rope parts; each concavely curved inner face of each jaw including transverse arcuate ribs adapted to engage the rope parts; the ribs of two cooperating jaws being staggered relative to each other; each rib defining together with the said concavely curved inner face of the opposite jaw a sectional reduction of said passage; said ribs being made from a material essentially softer than steel and adapted to flow at the contacting pressures between the rope parts and the ribs arising during said forcing of said jaws into tight gripping contact with the wire rope parts.

2. A wire rope clamp as stated in claim 1, each said jaw as a whole being made from a material essentially softer than steel.

3. A wire rope clamp as stated in claim 1, each said jaw being provided with an inner lining including portions forming said ribs and made from a material essentially softer than steel.

4. A wire rope clamp as stated in claim 1, each said jaw having on the inner face a number of transverse grooves, each said rib being made as a separate piece and inserted in one of said transverse grooves.

5. A wire rope clamp as stated in claim 1, at least said ribs of said jaws being made from a plastic.

6. A wire rope clamp as stated in claim 5, said plastic being nylon.

7. A wire rope clamp as stated in claim 1, at least said ribs of said jaws being made from a soft aluminum alloy.

8. A wire rope clamp as stated in claim 1, said material having an elastic limit below 9 kg./mm.$^2$.

9. A wire rope clamp, as claimed in claim 1, said ribs being sharp-edged.

10. A method of connecting two steel wire rope parts by means of a wire rope clamp comprising at least two clamping jaws provided with opposed concavely curved inner faces; a hollow outer casing, said jaws being adapted in assembled state to be introduced into said outer casing, means for longitudinally forcing said jaws into said outer casing, said outer casing having an inner surface, each said jaw having an outer surface, said inner surface and said outer surface being designed for providing a pressing together of said jaws when these are forced into said outer casing; said concavely curved inner faces of said jaws defining between them in the assembled state of the jaws a passage for said rope parts and being operable to be forced into tight gripping contact with said rope parts, each concavely curved inner face of each jaw including transverse arcuate ribs adapted to engage the rope parts and each providing a sectional reduction of said passage, each rib being made from a material essentially softer than steel and being adapted to flow at the contacting pressure between the rope parts and the ribs arising during said forcing of said jaws into tight gripping contact with the wire rope parts, said method comprising the steps of, arranging said jaws in assembled embracing relation with respect to said two wire rope parts, introducing said wire rope parts and said jaws assembled with respect thereto into said outer casing, forcing said jaws longitudinally into said outer casing thereby forcing said inner portions of said jaws into tight gripping contact with said wire rope parts; and heating said wire rope clamp is a high frequency field to soften the said ribs.

References Cited in the file of this patent

UNITED STATES PATENTS

| | | |
|---|---|---|
| 696,829 | Mack | Apr. 1, 1902 |
| 895,065 | Boulter | Aug. 4, 1908 |
| 1,642,628 | Philbrick | Sept. 13, 1927 |
| 1,647,398 | Draheim et al. | Nov. 1, 1927 |
| 1,710,243 | Rohrer | Apr. 23, 1929 |
| 2,225,169 | Gallagher | Dec. 17, 1940 |
| 2,225,865 | Harris | Dec. 24, 1940 |
| 2,357,733 | Guderian | Sept. 5, 1944 |
| 2,443,155 | Zahutnik | June 8, 1948 |
| 2,528,932 | Wiles et al. | Nov. 7, 1950 |
| 2,641,810 | Gasink | June 16, 1953 |
| 2,945,457 | Avery et al. | July 19, 1960 |

FOREIGN PATENTS

| | | |
|---|---|---|
| 429,572 | Great Britain | May 31, 1935 |
| 202,003 | Australia | May 30, 1956 |